United States Patent
Kim

(10) Patent No.: US 6,665,270 B1
(45) Date of Patent: Dec. 16, 2003

(54) APPARATUS AND METHOD FOR DISPLAYING TRANSFER SPEED IN PERSONAL DIGITAL ASSISTANT

(75) Inventor: Kyou-Woong Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/183,939

(22) Filed: Nov. 2, 1998

(30) Foreign Application Priority Data

Nov. 3, 1997 (KR) .......................................... 97/57817

(51) Int. Cl.⁷ ................................................ H04L 12/26
(52) U.S. Cl. ...................................... 370/252; 370/465
(58) Field of Search ................................. 370/352, 353, 370/354, 355, 356, 463, 465, 468, 252; 375/222

(56) References Cited

U.S. PATENT DOCUMENTS

| | | | |
|---|---|---|---|
| 4,749,825 A | 6/1988 | Stewart et al. ............ | 178/4.1 A |
| 5,031,178 A * | 7/1991 | Hartman ..................... | 371/29 |
| 5,590,339 A | 12/1996 | Chang ........................ | 395/750 |
| 6,144,464 A | 11/2000 | Rupp et al. ................. | 358/442 |

* cited by examiner

*Primary Examiner*—Steven Nguyen
*Assistant Examiner*—Duc Duong
(74) *Attorney, Agent, or Firm*—Dilworth & Barrese, LLP

(57) ABSTRACT

An apparatus and method for indicating a data transfer rate in a personal digital assistant. The apparatus includes a data processor for transmitting data through a serial communication port by using an application program; a radio communication part for transmitting data to the data processor through a serial communication port, determining a data transfer rate upon transmitting or receiving data, and generating transmitting and receiving display control signals; a transmitted status indicator for blinking at a prescribed period by the transmitting display control signal; and a received status indicator for blinking at a prescribed period by the receiving display control signal.

9 Claims, 3 Drawing Sheets

APPARATUS AND METHOD FOR DISPLAYING TRANSFER SPEED IN PERSONAL DIGITAL ASSISTANT

BACKGROUND OF THE INVENTION

1. Field of the Invention

The present invention relates generally to data communication and more particularly, to methods of and an apparatus for indicating data transfer rates.

2. Description of the Related Art

As the data communication field becomes increasingly personalized, the PDA is experiencing broad use allowing users to transmit and receive data irrespective of place or time. FIG. 1 illustrates a personal digital assistant (PDA) in accordance with the prior art. FIG. 1 illustrates an apparatus including a minicomputer (PDA module) 120 and a radio communication terminal (Code Division Multiple Access module CDMA) 110. CDMA module 110 transmits and receives information, via radio link, to a mobile user (i.e., on the street or in a car).

PDAs provide Internet access service for retrieving data, a facsimile service for transmitting a document or data, and an asynchronous data service.

To support the above services, the PDA module 120 preferably has an application program, (i.e., software). In addition, the PDA module 120 transmits digital data generated by the application program via a radio link through the radio communication terminal, (i.e., CDMA module 110).

To transmit digital data generated from the PDA module 120, the CDMA module 110 preferably utilizes a radio link protocol (RLP) based on IS-99 (Data Services Option Standard for Wideband Spread Spectrum Digital Cellular System) or IS-647 (Packet Data Service Option Standard for Wideband Spread Spectrum System) in addition to IS-95A (Mobile Station-Base Station Compatibility Standard for Dual-Mode Wideband Spread Spectrum Cellular System).

Further, digital data generated from the PDA module 120 is commonly transmitted and received at standard data transfer rates, including 1200 bps, 4800 bps, and 9600 bps.

However, when a user transmits or receives data via radio link there is no way to know the data transfer rate. The reliability of a conventional PDA system is diminished as a result.

SUMMARY OF THE INVENTION

It is therefore an object of the present invention to provide methods of and an apparatus for indicating transmitted and received data transfer rates.

In one embodiment of the present invention, apparatus for indicating transmitted and received data transfer rates include an apparatus for indicating a data transfer rate in a personal digital assistant which can transmit and process data by radio communication, said apparatus comprising: a data processor for transmitting data through a serial communication port by using an application program; a radio communication part for transmitting data to said data processor through a serial communication port, determining a data transfer rate upon transmitting or receiving data, and generating transmitting and receiving display control signals; a transmitted status indicator for blinking at a prescribed period by said transmitting display control signal; and a received status indicator for blinking at a prescribed period by said receiving display control signal.

In one embodiment of the present invention, a method for indicating transmitted and received data transfer rates include a method for indicating a data transfer rate in a personal digital assistant which can transmit and process data by radio communication, said method comprising the steps of: determining a transfer rate of data provided through a serial communication port and causing a transmitted status lamp to blink at a period corresponding to the determined transfer rate; and determining a transfer rate of data received by radio communication and causing a received status lamp to blink at a period corresponding to the determined transfer rate.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described hereinbelow with reference to the accompanying drawings.

Figure 1:
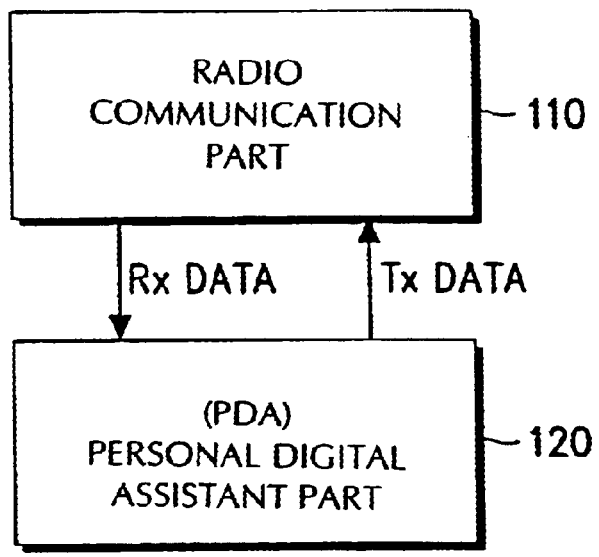
FIG. 1 is a block diagram of a conventional PDA in accordance with the prior art.
Figure 2:
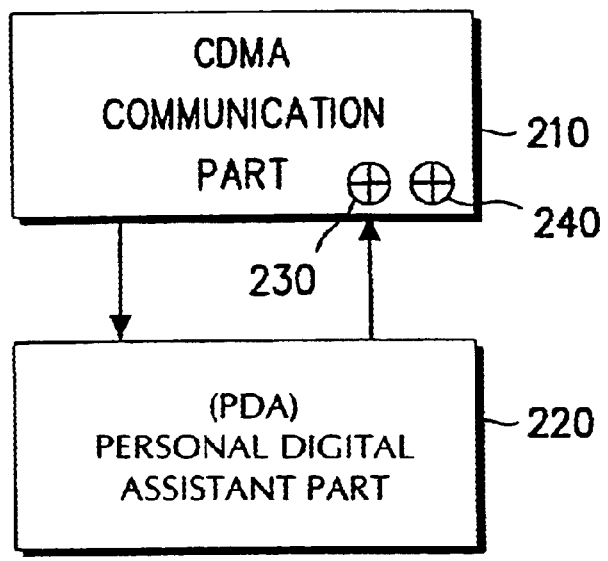
FIG. 2 is a block diagram of a PDA according to a preferred embodiment of the present invention.

A PDA according to a preferred embodiment of the present invention is shown in FIG. 2 including a data processor (PDA module) 220 and a radio communication terminal (i.e., CDMA communication module) 210. The PDA module 220 is preferably a minicomputer. The CDMA module 210 is further comprised of a transmit status indicator 230 for indicating a transmitted data transfer rate and a receive status indicator 240 for indicating a received data transfer rate. The PDA module 220 operates an application program and has an RS-232C-E port for serial communication. The PDA module 220 also has TCP/IP (Transmission Control Protocol/Internet Protocol) and a PPP protocol stack for accessing the Internet.

The communication (CDMA) module 210 is constructed in accordance with the IS-99/IS-657 standard which is compatible for digital communication with IS-95A. CDMA module 210 also has an RS-232C-E port for serial communication with the PDA module 220. The CDMA module 210 further includes transmit 230 and receive 240 status indicators for indicating a data transfer rate associated with PDA digital data inserted into a CDMA traffic channel. The indicators 230 and 240 may use lamps.

Figure 3:
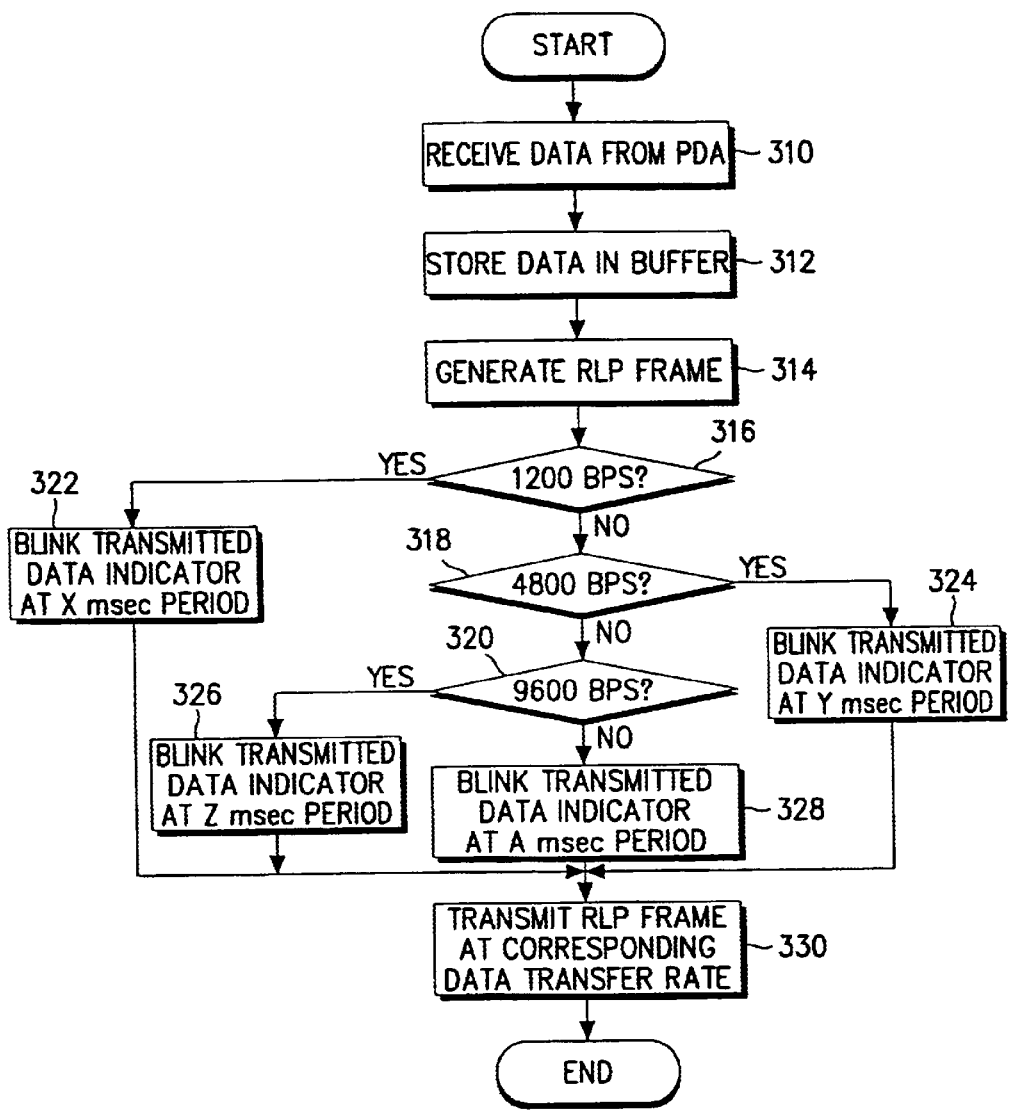
FIG. 3 is a flow chart of a control process for indicating a transmitted data transfer rate according to a preferred embodiment of the present invention.

FIG. 3 is a flowchart illustrating a preferred method for indicating a transmitted data transfer rate. A data transfer rate received from the data processor (PDA) module 220 is determined and a transmit status lamp blinks at a period corresponding to the determined data transfer rate, as shown in FIG. 3.

Data generated from the PDA module 220 is produced as frame data through the TCP/IP and PPP protocol stack and transmitted to the CDMA module 210 through the CDMA's RS-232C-E serial port.

The CDMA module 210 receives the data transmitted from the PDA module 220 through RS-232C-E at step 310 and stores the received data in an internal buffer at step 312. At step 314 a CPU (not shown) of the CDMA module 210 determines a data transfer rate (i.e., 1200 bps, 4800 bps, and 9600 bps) according to the amount of data stored in the buffer with respect to every CDMA frame boundary of 20 msec. An RLP layer generates an RLP frame by the determined data transfer rate.

The operation of the transmit status indicator lamp 230 is described at steps 316 to 328. The CDMA module 210 checks the determined data transfer rate at steps 316 to 320. If the data transfer rate is determined to be 1200 bps at step 316, the CDMA module 210 proceeds to step 322; if it is determined to be 4800 bps at step 318, the CDMA module 210 proceeds to step 324; and if it is determined to be 9600 bps at step 320, the CDMA module 210 proceeds to step 326.

The CDMA module 210 will blink the transmit status indicator lamp 230 at a prescribed rate, as defined by steps 322, 324 and 326, according to the determined data transfer rate as defined by steps 316, 318 and 320, respectively. In particular, steps 322, 324 and 326, the transmit status indicator lamp 230 blinks at periods of X msec, Y msec and Z msec corresponding to the data transfer rates of 1400 bps, 4800 bps and 9600 bps, respectively. In the preferred embodiment, Z msec<Y msec<X msec. If the data transfer rate conditions are not satisfied, the transmitted status indicator 230 blinks at a period of A msec. At step 330, the CDMA module 210 transmits the generated RLP frame at the next 20 msec frame boundary.

Figure 4:
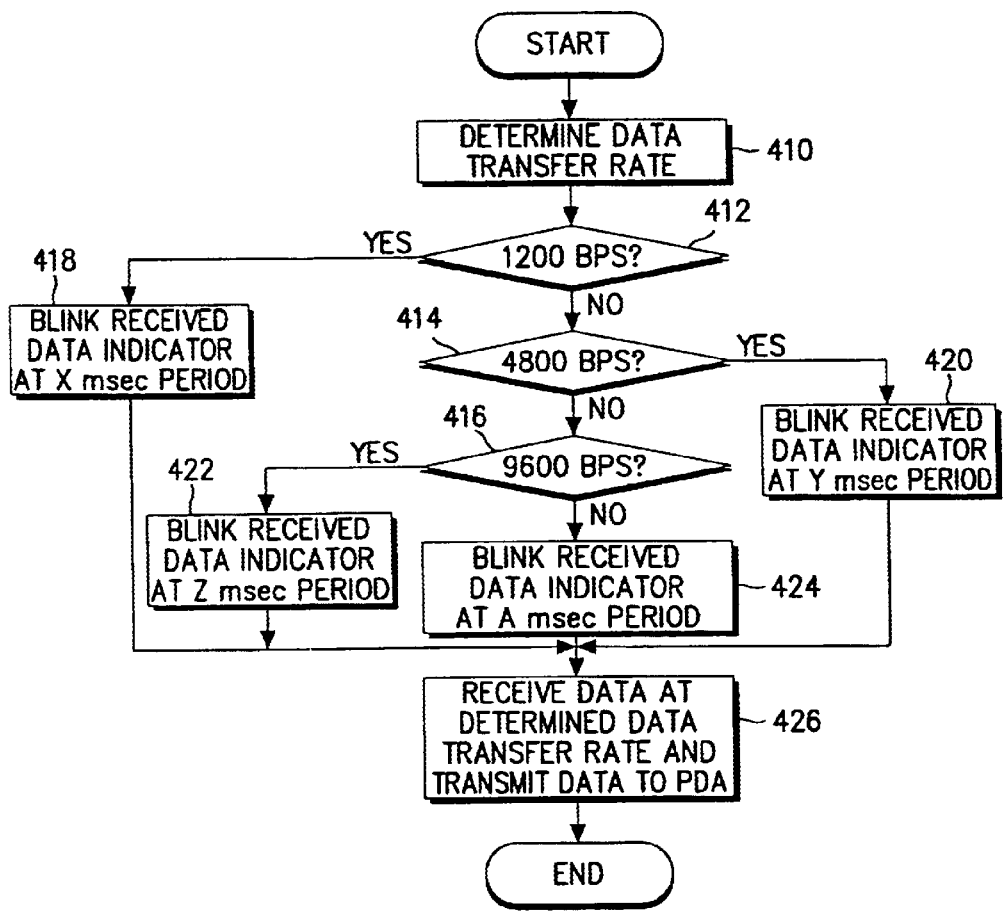
FIG. 4 is a flow chart of a control process for indicating a received data transfer rate according to a preferred embodiment of the present invention.

FIG. 4 is a flowchart illustrating a preferred method for indicating a received data transfer rate. At step 410, the CDMA module 210 determines a received data transfer rate. Next, at steps 412 to 416, the CDMA module 120 checks the determined transfer rate. If the received data transfer rate is determined to be 1200 bps at step 414, the CDMA module 210 proceeds to step 418; if it is determined to be 4800 bps, the CDMA module 210 proceeds to step 420; and if ti is determined to be 9600 bps at step 416, the CDMA module 210 proceeds to step 422. The CDMA module 210 will blink the receive status indicator lamp 240 at a prescribed rate as defined by steps 418, 420 and 422. In particular, at steps 418, 420 and 422 the receive status indicator lamp 240 blinks at periods of X msec, Y msec and Z msec corresponding to the data transfer rates of 1200 bps, 4800 bps, and 9600bps, respectively. In the preferred embodiment, Z msec<Y msec<X msec. If the data transfer rate conditions are not satisfied, the receive status indicator lamp 240 blinks at a period of A msec. At step 426, the CDMA module 210 receives data at the determined data transfer rate and transmits the received data to the PDA module 220 through the RS-232C-E port.

As described above, the method of the present invention blinks the receive and transmit indicator lamp at a period corresponding to the receive and transmit data transfer rates, respectively, thereby informing the user of the current data transfer rates and the operating status of the PDA.

What is claimed is:
1. An apparatus for indicating a data transfer rate, including a data processor for transmitting data and a radio communication part for:
(1) transmitting to said data processor data generated by an application program,
(2) determining a data transfer rate upon transmitting or receiving data, and
(3) generating transmitting and receiving display control signals, the radio communication part further comprising an internal buffer for storing data received from said data processor;
the apparatus comprising:
a transmit status indicator for blinking at a prescribed period that varies responsive to said transmitting display control signal; and
a receive status indicator for blinking at a prescribed period that varies responsive to said receiving display control signal.
2. The apparatus of claim 1, wherein said data is digital data generated by said application program.
3. The apparatus of claim 1, wherein said data is transmitted at one of 1200 bps, 4800 bps, and 9600 bps.
4. The apparatus of claim 1, further comprising a serial communication port for transmitting serial data to said radio communication part.
5. The apparatus of claim 1, wherein said radio communication part utilizes a radio link protocol for transmitting and receiving said data.
6. The apparatus of claim 5, wherein said radio link protocol is based on one of Data Services Option Standard for Wideband Spread Spectrum Digital Cellular System, Packet Data Service Option Standard for Wideband Spread Spectrum System, and Mobile Station-Base Station Compatibility Standard for Dual-Mode Wideband Spectrum Cellular System.
7. The apparatus of claim 1, wherein said data transfer rate is determined in accordance with an amount of data stored in said internal buffer.
8. The apparatus of claim 7, wherein said transmit display control signal is generated as a function of said amount of data stored in said internal buffer.
9. A method for indicating a data transfer rate in a personal digital assistant comprising the steps of:
transmitting data by radio communication via a radio communication part;
processing data, wherein said radio communication part is operatively coupled to a data processor through a serial communication port, said radio communication part further comprising an internal buffer for storing data received from a data processor; and
determining by said data processor a transfer rate of data to be transmitted or received and blinking a lamp at a frequency that varies corresponding to the determined transfer rate.

* * * * *